(12) United States Patent
Kenney

(10) Patent No.: US 8,511,498 B2
(45) Date of Patent: Aug. 20, 2013

(54) METHOD FOR MANUFACTURING AN ELECTRONIC DEVICE ENCLOSURE

(75) Inventor: Kevin M. Kenney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 656 days.

(21) Appl. No.: 12/692,803

(22) Filed: Jan. 25, 2010

(65) Prior Publication Data

US 2011/0180557 A1    Jul. 28, 2011

(51) Int. Cl.
*B65D 1/40* (2006.01)
*H05K 5/02* (2006.01)

(52) U.S. Cl.
USPC .................................. 220/62.22; 361/679.02

(58) Field of Classification Search
USPC ............. 220/62.19, 675, 669, 682, 677, 4.02, 220/3.94, 62.22, 328, 327, 315; 156/242; 428/36.3
IPC ...................... B65D 1/40, 3/22, 8/18, 8/08, 8/04
See application file for complete search history.

(56) References Cited

U.S. PATENT DOCUMENTS

| | | | |
|---|---|---|---|
| 2,638,523 A * | 5/1953 | Rubin | 338/237 |
| 3,814,016 A | 6/1974 | Leach et al. | |
| 5,116,138 A | 5/1992 | Macsenti et al. | |
| 5,237,788 A | 8/1993 | Sandow | |
| 5,249,534 A | 10/1993 | Sacks | |
| 5,395,682 A | 3/1995 | Holland et al. | |
| 5,503,506 A | 4/1996 | Yuan | |
| 5,865,569 A | 2/1999 | Holstein et al. | |
| 5,967,357 A | 10/1999 | Kellogg et al. | |
| 6,193,089 B1 * | 2/2001 | Yu | 220/4.21 |
| 6,435,363 B2 | 8/2002 | Fingerhut et al. | |
| 6,437,238 B1 * | 8/2002 | Annerino et al. | 174/50 |
| 6,689,246 B2 | 2/2004 | Hirahara et al. | |
| 7,063,763 B2 | 6/2006 | Chapman, Jr. | |
| 7,191,555 B2 | 3/2007 | Hughes | |
| 7,338,235 B2 | 3/2008 | Weghaus et al. | |
| 7,527,321 B1 | 5/2009 | Benderoth et al. | |
| 7,545,628 B2 | 6/2009 | Takuma | |
| 7,571,828 B2 | 8/2009 | Palley et al. | |
| 7,628,879 B2 | 12/2009 | Ackerman | |
| 7,762,028 B2 | 7/2010 | Valentz et al. | |
| 7,790,637 B2 | 9/2010 | DiFonzo et al. | |
| 7,934,676 B2 | 5/2011 | Dufresne et al. | |
| 7,963,483 B2 | 6/2011 | Roming et al. | |
| 7,971,400 B2 | 7/2011 | Boldt et al. | |
| 2007/0171603 A1 * | 7/2007 | Yang et al. | 361/679 |
| 2008/0094372 A1 | 4/2008 | Philipp | |
| 2008/0259537 A1 | 10/2008 | Arisaka et al. | |
| 2009/0040703 A1 | 2/2009 | Gotham et al. | |

(Continued)

FOREIGN PATENT DOCUMENTS

| | | |
|---|---|---|
| EP | 1139638 | 10/2001 |
| EP | 2051572 | 4/2009 |

(Continued)

*Primary Examiner* — Robert J Hicks
(74) *Attorney, Agent, or Firm* — Dorsey & Whitney LLP

(57) ABSTRACT

A method for manufacturing an enclosure for an electronic device including forming the enclosure, forming one or more locating cavities on a surface of the enclosure, attaching one or more blanks to the enclosure using the one or more locating cavities, and processing the one or more attached blanks to form a desired shape thereof. The enclosure may be formed from a fiber-in-matrix material. A layered fiber-in-matrix type material, such as CFRP, may be used.

12 Claims, 10 Drawing Sheets

(56) References Cited

U.S. PATENT DOCUMENTS

| | | |
|---|---|---|
| 2009/0095523 A1 | 4/2009 | Stevenson et al. |
| 2009/0110872 A1* | 4/2009 | DiFonzo et al. ............. 428/113 |
| 2009/0142157 A1* | 6/2009 | Wang et al. ................... 411/337 |
| 2009/0267266 A1* | 10/2009 | Lee et al. ................. 264/272.11 |
| 2010/0078254 A1 | 4/2010 | Rolfe et al. |
| 2010/0289390 A1 | 11/2010 | Kenney |
| 2011/0183580 A1 | 7/2011 | Kenney |
| 2011/0290685 A1 | 12/2011 | Kenney |
| 2012/0021196 A1 | 1/2012 | Kenney |

FOREIGN PATENT DOCUMENTS

| | | |
|---|---|---|
| JP | 2006123475 | 5/2006 |
| JP | 2007076202 | 3/2007 |
| WO | WO98/15404 | 4/1998 |
| WO | WO2008/133748 | 11/2008 |
| WO | WO2009/017571 | 5/2009 |

* cited by examiner

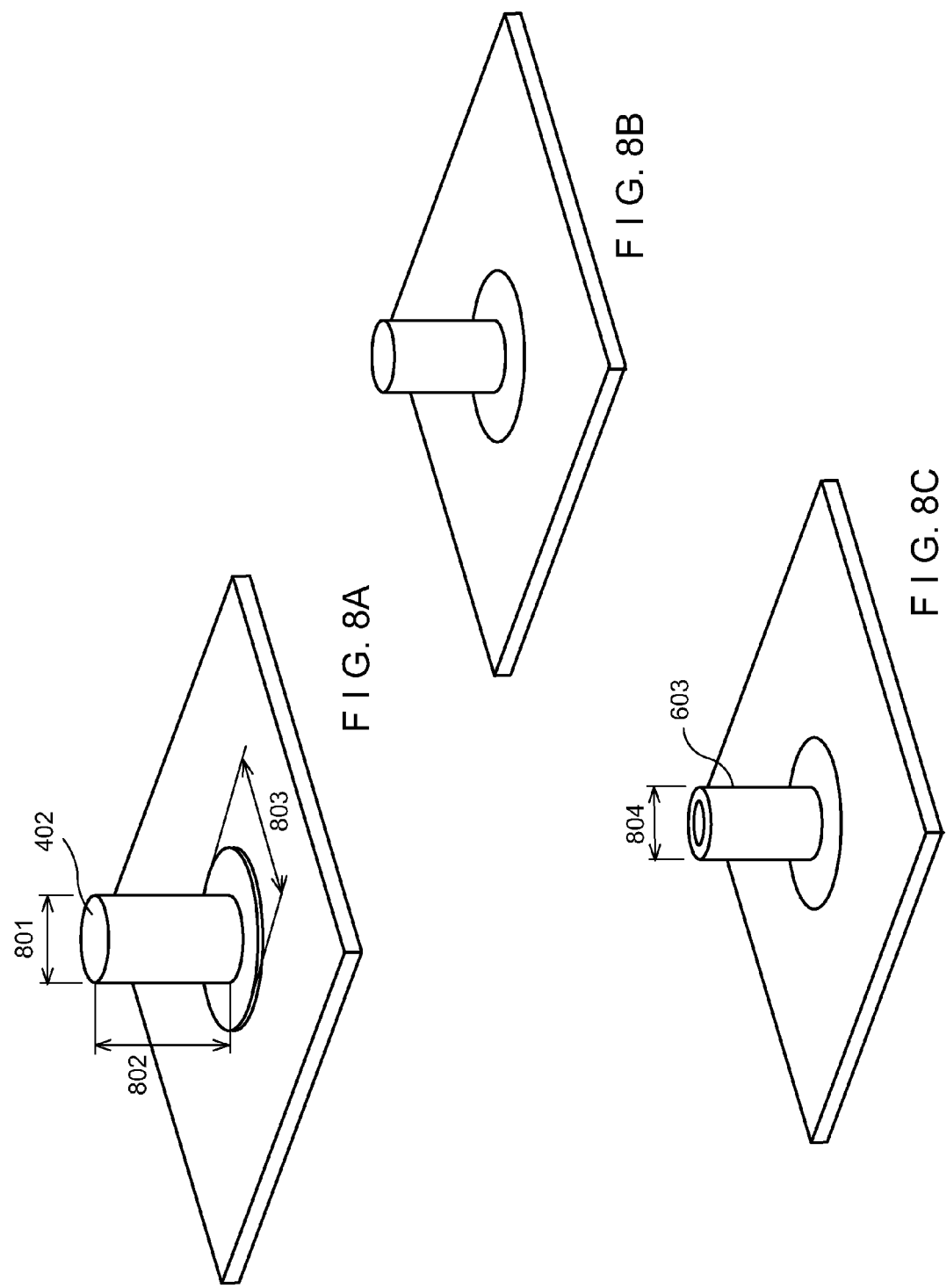

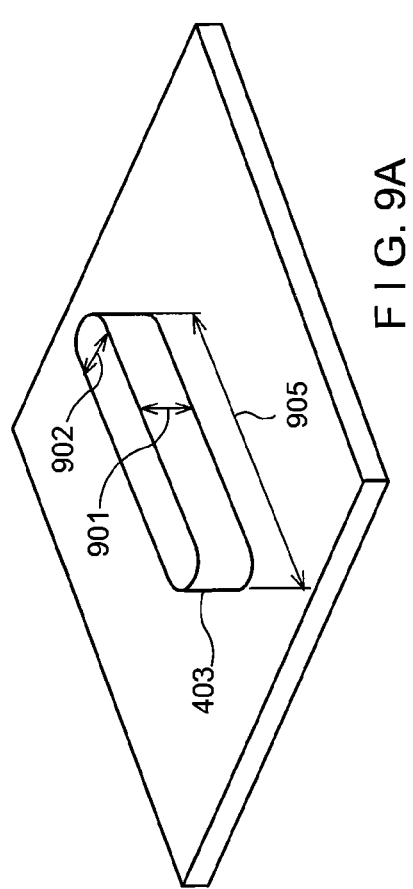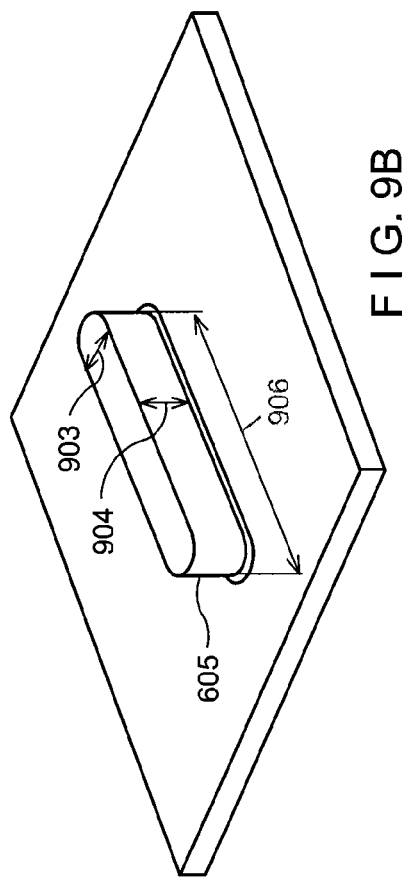

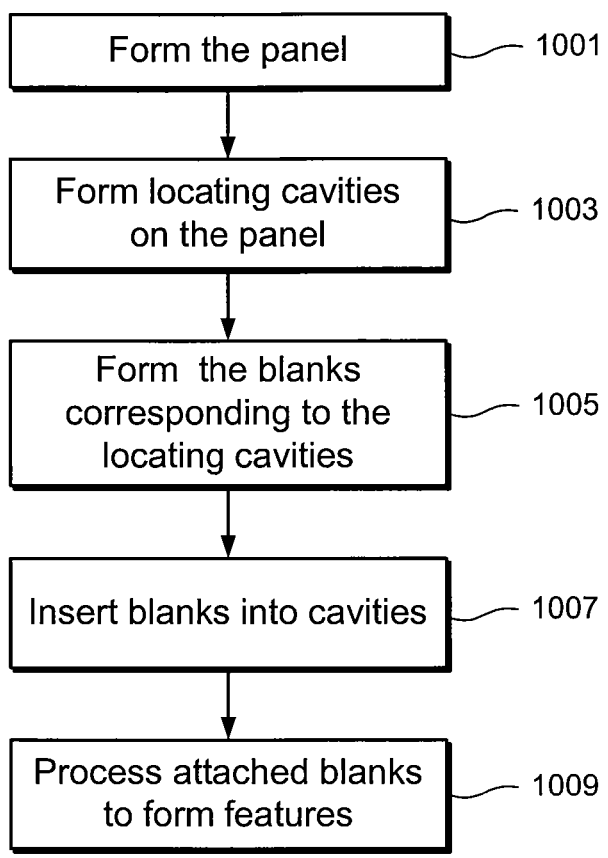
F I G. 10

METHOD FOR MANUFACTURING AN ELECTRONIC DEVICE ENCLOSURE

BACKGROUND

1. Technical Field

Embodiments disclosed herein relate generally to enclosures for electronics, and more specifically to methods of manufacturing enclosures formed from a fiber-in-matrix material.

2. Background

Many electronic devices, including portable electronic devices, have enclosures made of a fiber-in-matrix material. For example, certain devices may have an enclosure formed from carbon fiber reinforced plastic ("CFRP"). A standard CFRP may be made of multiple layers, each of which typically has carbon fibers aligned in a plastic matrix such that the fibers all extend in substantially the same direction within that layer. The carbon fibers impart structural strength as well as resistance to bending and breaking against force applied transversely to the length of the fibers. As such, CFRP materials generally have a high strength to weight ratio and weight to stiffness ratio, but tend to crack or bend under shear stresses, such as may occur when a CFRP sheet is bent along the axis of the constituent carbon fibers.

Electronic device enclosures may include multiple CFRP panels that are assembled into a unitary body to form the enclosure. The interior-facing surface of the assembled CFRP panels may include multiple protruding features, such as male and female alignment features, bosses, wire guides, and so on and so forth. These protruding features often require precise computer numerical controlled (CNC) machining techniques for their manufacture. However, given the susceptibility of CFRP to cracking or bending under shear stress, processing CFRP using CNC machining applications to form the protruding features may not be ideal.

SUMMARY

Generally, embodiments described herein take the form of a method for manufacturing an enclosure for an electronic device. The method may include forming a shape of the enclosure, forming one or more locating cavities on a surface of the enclosure, attaching one or more blanks to the enclosure using the one or more locating cavities, and processing the one or more attached blanks to form a desired shape thereof.

In one embodiment, the one or more locating cavities defines an attachment surface, and the one or more blanks are attached to the attachment surface. In another embodiment, a base surface of the one or more blanks is bonded to the attachment surface. Additionally, the enclosure may be formed from a first material and the blanks may be formed from a second material different from the first material.

In one embodiment, the first material is a fiber-in-matrix material, such as a carbon fiber-reinforced polymer. In another embodiment, the second material is aluminum. In a further embodiment, the enclosure is formed by an injection molding process. In another embodiment, the one or more attached blanks are processed using a computer numerical controlled process.

In an additional embodiment, at least one of the one or more attached blanks is processed to form multiple protruding features. In a further embodiment, at least one of the one or more attached blanks includes a base portion and a body portion. The base portion has a first horizontal cross-sectional area and the body portion has a second horizontal cross-sectional area, and the first horizontal cross-sectional area is larger than the second horizontal cross-sectional area. In another embodiment, at least one of the one or more attached blanks has a uniform horizontal cross-sectional area.

Another embodiment of the present disclosure relates to a housing. The housing includes a panel formed from a first material. The panel includes a locating cavity on a surface thereof and the locating cavity defines an attachment surface. The panel further includes a protruding feature formed from a blank formed from a second material different than the first material. The blank is attached to the attachment surface before the protruding feature is formed.

Another embodiment of the present disclosure relates to an object. The object includes a casing formed from a first material. The casing includes at least one locating cavity on a surface thereof defining an attachment surface. The object further includes at least one protruding feature formed from a blank formed from a second material different from the first material. The at least one protruding feature is formed from a blank that is attached to the attachment surface before the at least one protruding feature is formed.

BRIEF DESCRIPTION OF THE FIGURES

FIG. 8A depicts a sample boss during a first manufacturing stage.

FIG. 8B depicts the sample boss of FIG. 8A after partial machining.

FIG. 8C depicts the sample boss of FIGS. 8A & B after a further machining operation.

FIG. 9A. is a perspective view of a sample fitting, as shown during the manufacturing of the embodiment.

FIG. 9B is a perspective view of the sample fitting of FIG. 9A, showing a ridged configuration created by machining the fitting of FIG. 9A.

FIG. 10 is a flowchart setting forth a sample method for manufacturing a sample embodiment.

DETAILED DESCRIPTION

Generally, embodiments described herein take the form of an enclosure for an electronic device and a method for manufacturing the same. The enclosure may be made from a layered fiber-in-matrix type material, such as CFRP. In a sample embodiment, the enclosure may include at least one CFRP panel. The panel may include one or more locating features on the surface of the enclosure. The features may be configured to receive one or more blanks, which may be attached to an attachment surface defined by each cavity. The attached blanks may be processed to form the finished protruding feature, as generally described below.

As shown in FIG. 1, in one embodiment, the enclosure 105 may be a housing for a laptop computer 101. The enclosure 105 may be configured to house the electronic and mechanical components of the laptop computer 101, including, but not limited to, a keyboard, wires, a logic board, central processing unit (CPU), various chips, and/or a fan, as well as any other components required to operate the computer 101. In some embodiments, the enclosure may also house the display, as well.

It should be noted that the enclosure may be an enclosure for any electronic or mechanical device, and that the present disclosure describes an enclosure for a laptop computer for clarification purposes, and not to limit the present disclosure. In other embodiments, for example, the enclosure may be for an MP3 player, a CD player, tablet computing device, mobile phone, a housing for audio or video equipment, a protective carrying case for an enclosed electronic device, and so on and so forth.

Figure 1A:
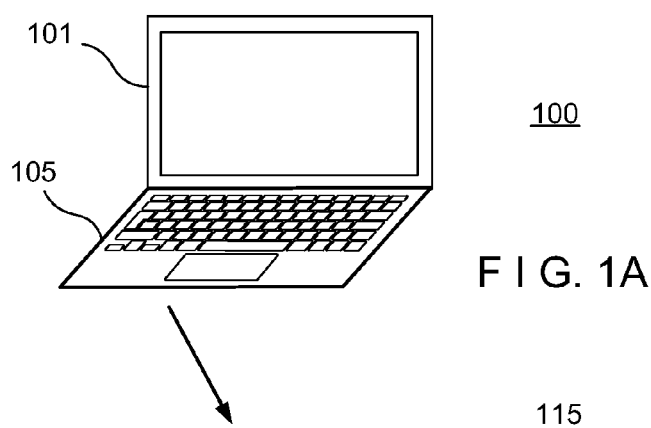
FIG. 1A is a perspective view of a sample embodiment.

As shown in FIG. 1A, multiple panels 111, 113, 115 and 117 that connect to one another to form the enclosure 105. For example, a laptop computer 101 as depicted in FIG. 1 may include four panels, with two panels 111 and 113 being connected to enclose the screen portion of the laptop 101 and two panels 115 and 117 being connected to enclose the keyboard portion of the laptop 101. (As discussed in further detail below, one or more of the panels may also form a sidewall(s) of the enclosure 105.) As mentioned above, the panels 111-117 of the enclosure 105 may be formed from CFRP or another polymer material reinforced with substantially aligned fibers. The panels 111-117 may include a substantially flat rectangular member having rounded outer edges. In addition, some of the panels 113 and 115 may include one or more apertures 119 that are configured to receive or show therethrough various components of the computer 105. These apertures 119 may allow a user to interact with the computer components. For example, the top keyboard panel 115 may include multiple apertures 119 to accommodate keyboard keys, while the top screen panel 113 may include a large aperture for framing a liquid crystal display (LCD) screen or other display, such as an OLED panel, LED panel and so on. In other embodiments, the enclosure 105 may include any number of apertures 119, which may vary in shape and in size.

Figure 1B:
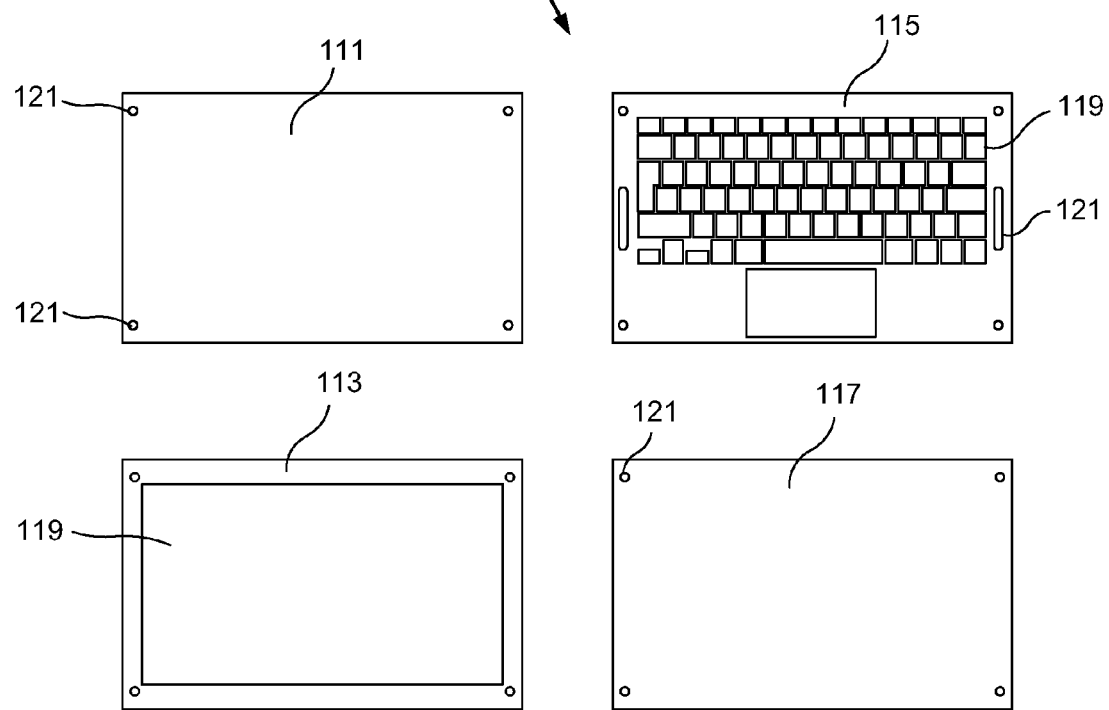
FIG. 1B is an exploded view of at least a portion of a sample embodiment.

The panels 111-117 may each have an exterior surface and an interior surface. As shown in FIG. 1B, the interior surfaces of the panels 111-117 may each define one or more protruding features 121. The protruding features 121 may be located anywhere on the interior surfaces of the panels 111-117, such as along the edge of the panels 111-117 or in the middle of the panels 111-117. As will be discussed further below, the features 121 may be joined to the panels 111-117 using any attachment method, including but not limited to, bonding, welding, (such as laser, sonic or friction welding) and/or brazing.

The finished protruding features 121 may form a variety of configurations that encompass a variety of features, such as, but not limited to, tubular mounting bosses, cylindrical features, hinge mounts, screw threads, polygonal features, threaded holes, pockets for clearance, pockets for wire routing and/or hinge mounts, and so on and so forth. In one embodiment, the protruding features 121 located on any two corresponding or mating panels, such as the two panels 111 and 113 enclosing the screen portion of the laptop 101 or the two panels 115 and 117 enclosing the keyboard portion of the laptop 101, may include respective male and female alignment features for facilitating assembly of the enclosure 105.

As will be described below, the protruding features 121 may be made from a material different from the material used to form the panels 111-117.

The exterior surfaces of the panels 111-117, which may be a surface handled and seen by a user, may be processed to be substantially smooth although the shape and finish of the panels' exterior surfaces may vary in alternative embodiments. For example, the exterior surfaces may be stamped, bent, embossed, and/or include protruding features, in accordance with the aesthetic and/or functional specifications of the finished electronic device.

A sample method for manufacturing the embodiment 100, as well as other possible embodiments, is discussed with respect to FIGS. 2-8.

Figure 2:
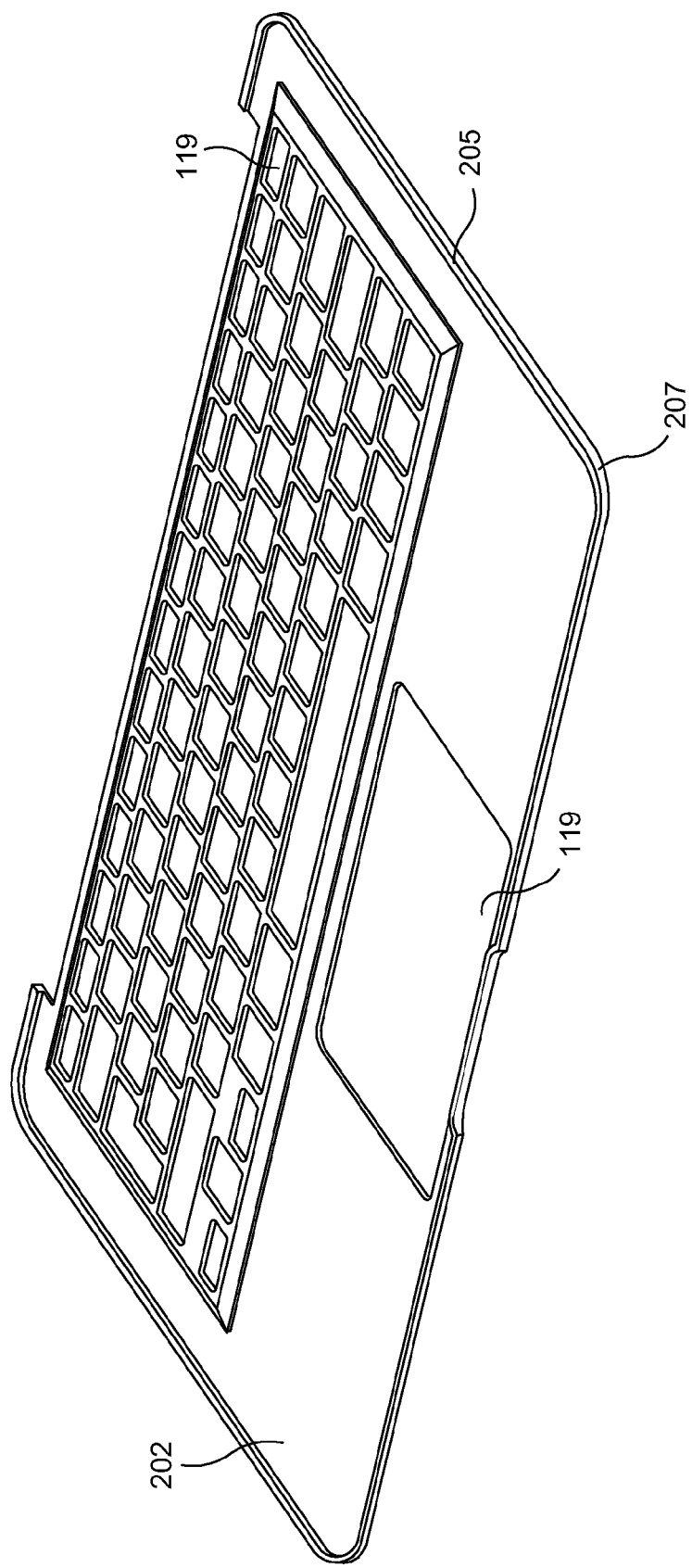
FIG. 2 depicts a perspective view of a sample embodiment shown during manufacturing of the embodiment before cavities are formed on the embodiment.

FIG. 2 illustrates one example of a panel 202 that has been formed into the shape of a top keyboard panel, but which has not yet been processed to create any protruding features. In one embodiment, the panel 202 is made of a CFRP or other fiber-in-matrix material, for example by mixing chopped carbon fibers with epoxy and then compression molding the resulting mixture as follows. A mixture, typically a powder, granular blend or heterogeneous combination of an epoxy and fiber, is placed in a mold base. A top plate of the mold is lowered into the mold base and distributes the powder within a void space formed by the top plate and mold base. Generally, this void space forms the shape of the panel 202 without protruding features. The mold is heated while the powder is compressed by the mold. As the mixture heats, the epoxy melts and flows to fill the void space, thereby distributing the chopped carbon fibers throughout the space. As the epoxy cools, it hardens into a matrix around the carbon fibers. When the epoxy sets, the panel 202 is formed and may be removed from the mold.

As shown in FIG. 2, the panel 202 may have a generally rectangular shape and substantially uniform thickness. However, in some embodiments, portions of the panel 202 may vary in thickness. Likewise, the shape of the panel or any other structure created in accordance with this disclosure may vary as desired. Additionally, the panel 202 may include multiple apertures 119 for receiving keys, a touchpad and/or other input elements. Some of the edges 205 of the panel 202 may be curved or bent so that when the enclosure is assembled, the edges 205 of the panel 202 may align with an mating panel. In one embodiment, the edges 205 may form a wall that has a substantially uniform height. Additionally, the corners 207 of the panel 202 may be curved in a fashion similar to the edges 205 of the panel 202 to form corner walls, with each corner wall being substantially the same height as the other corner walls. The corners 207 of the panel itself may be rounded. As shown in FIG. 2, in one embodiment, the walls defined by the edges 205 and the corners 207 of the panel 202 may have a uniform height.

In other embodiments, the heights of the edges 205 or the corners 207 of the panel 202 may be different. Additionally, the edges of the panel may be bent at an angle toward the opposing mating panel, rather than curved, and the corners of the panel may be pointed, rather than rounded. The panel may also be any shape and/or size, such as a circle or another polygon. The shape of the panel may be determined by the mold used to form the panel. Additionally, the panel may have any number of apertures, which may vary in shape and in size. The configuration of the apertures may also be determined by the mold used to form the panel.

In other embodiments, the panel 202 may be made from other materials, including, but not limited to, other fiber-in-matrix materials, injection-molded thermoplastic, thermoformed thermoplastic, blow-molded thermoplastic, stamped metal, forged metal, and superplastic-formed metal. For example, the material may employ a reinforcing fiber such as a glass fiber, aramid (one example of which is KEVLAR), polyethylene (including DYNEEMA and SPECTRA), polypropylene and others. The material may use other matrix components, including any other type of thermosetting material (examples of which are polyester, vinyl ester, phenolics, and so on), thermoplastics including nylon or another polyamide, polypropylene, high density polyethylene, Peek, and others. Accordingly, it should be understood that any of the foregoing materials may be employed singly or in combination instead of CFRP in some embodiments. Thus, references herein to "CFRP" should be understood to be provided as only one example of the foregoing materials and combinations.

Figure 3:
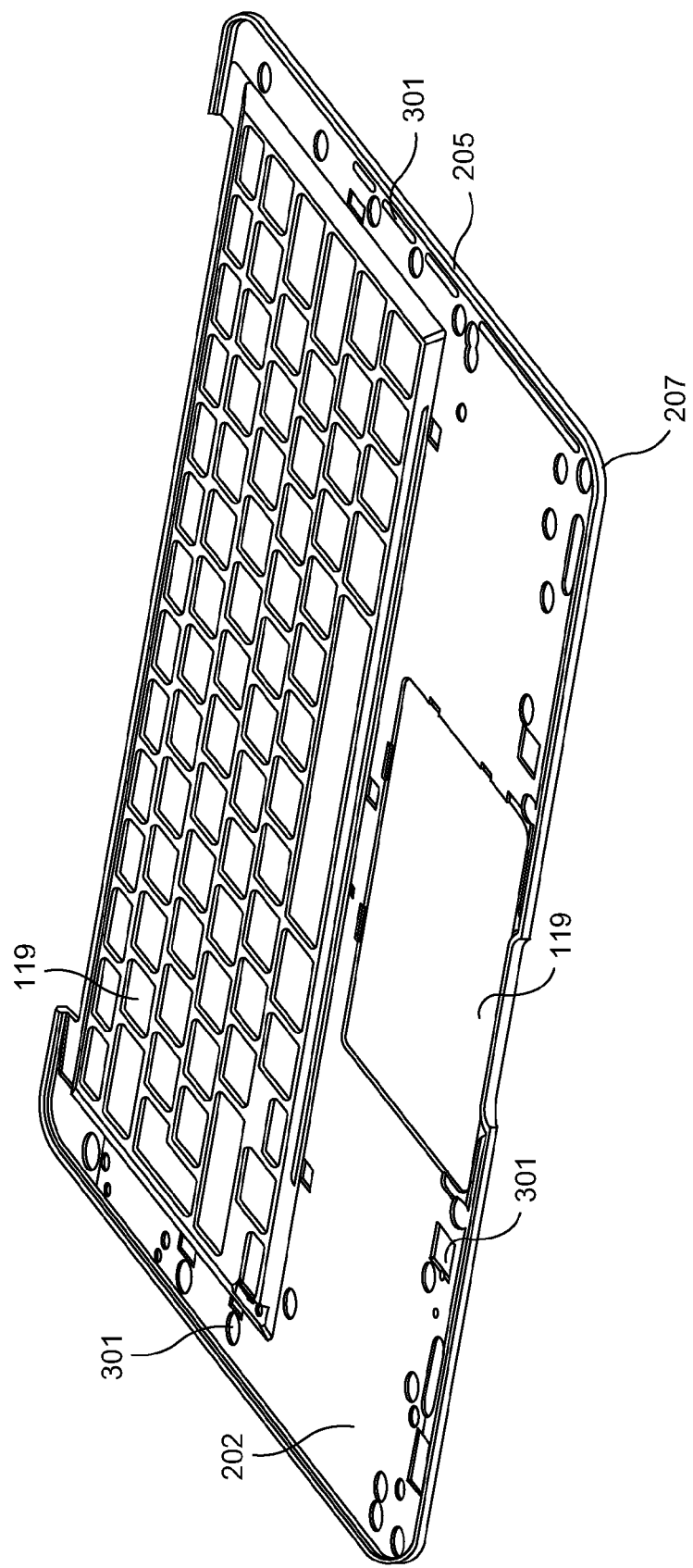
FIG. 3 depicts a perspective view of the sample embodiment of FIG. 2, shown during manufacturing of the embodiment before blanks are attached to the embodiment.

FIG. 3 illustrates one example of a panel 202 that has been machined to define one or more locating features, such as cavities 301, for positioning the blanks that will be machined to form the finished protruding features. The locating cavities 301 may be formed using a CNC machining process, or using any other automated or manual machining technique.

In one embodiment, the locating cavities 301 may have a depth that is approximately 35% of the thickness of the panel 202. The base of the locating cavities 301 may define a smooth and flat attachment surface that is configured for attaching the blank. As will be discussed further below, the flat platform provided by the attachment surfaces of the locating cavities 301 may facilitate subsequent joining operations between the blanks and the attachment surfaces.

The locating cavities 301 may also serve as a mechanism for positioning blanks on the panel without requiring other locating fixtures or additional devices. The dimensions of the locating cavities 301 may vary, but generally may be configured to be slightly larger than a received portion of a blank. For example, the locating cavities 301 may be configured so that when the blank is inserted into the cavity, the base of the blank is in contact with the attachment surface and the sides of the blank are in contact, or nearly in contact, with the sidewalls of the locating cavity 301. In other embodiments, there may be a gap between the sides of the blank and the sidewall of the locating cavity 301 when the blank is fully inserted into the cavity.

In one embodiment, the width of the locating cavity 301 for receiving a non-cylindrical feature may be approximately two (2) times the overall thickness of the finished protruding feature(s) inserted into the cavity 301. For a cylindrical feature, such as a mounting boss, the counterbore diameter may be approximately two (2) times the nominal diameter of the finished boss. Thus, as an example, the locating cavity 301 for receiving a finished boss having a finished outer diameter of 1 mm may have an outer diameter of 2 mm. In other embodiments, the locating cavities 301 may be between 1.5 to 2.5 times the overall thickness of the finished protruding feature being deposited in the cavity.

Figure 4:
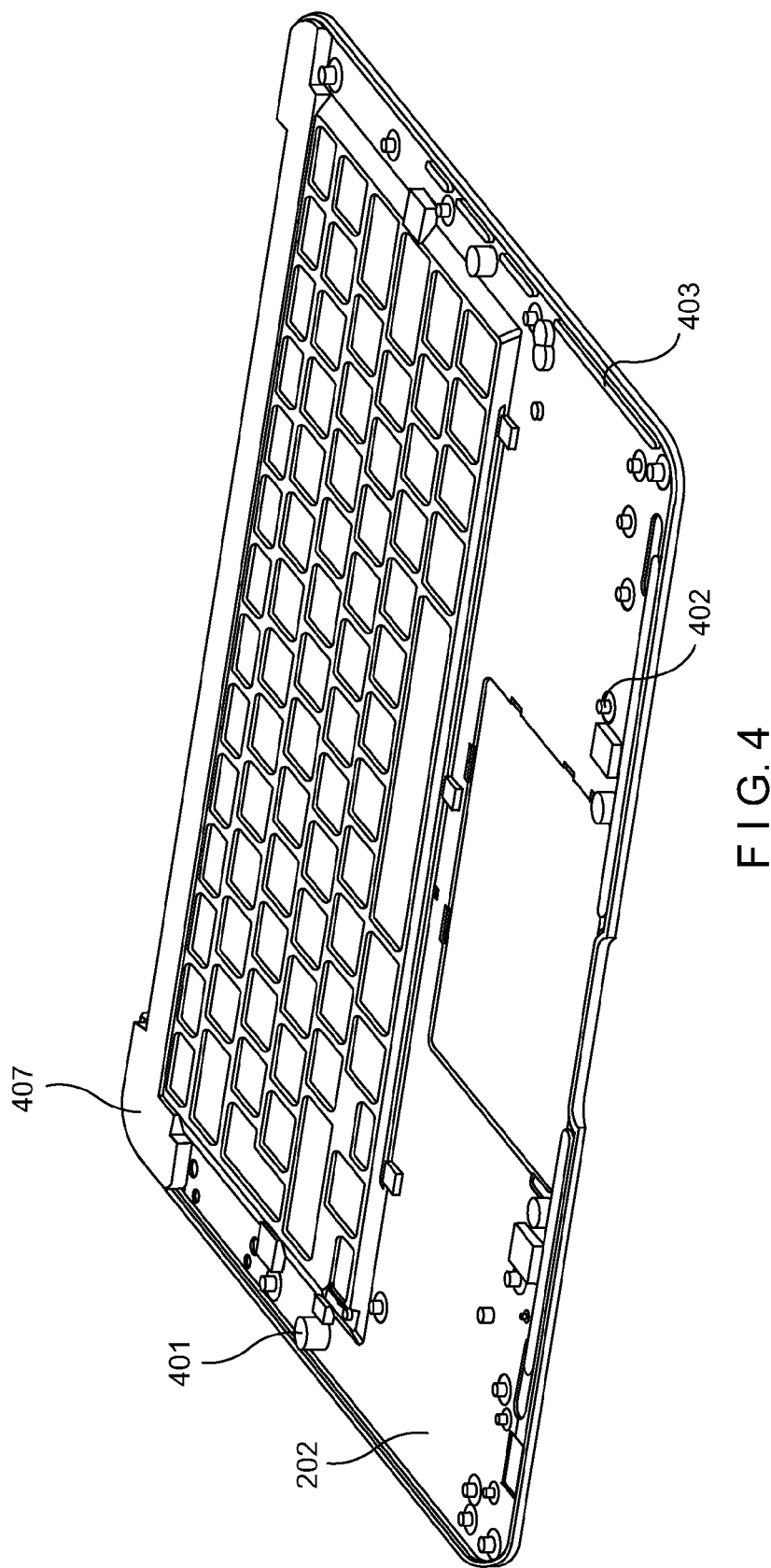
FIG. 4 depicts a perspective view of the sample embodiment of FIG. 2, shown during manufacturing of the embodiment after blanks are attached to the embodiment.
Figure 5:
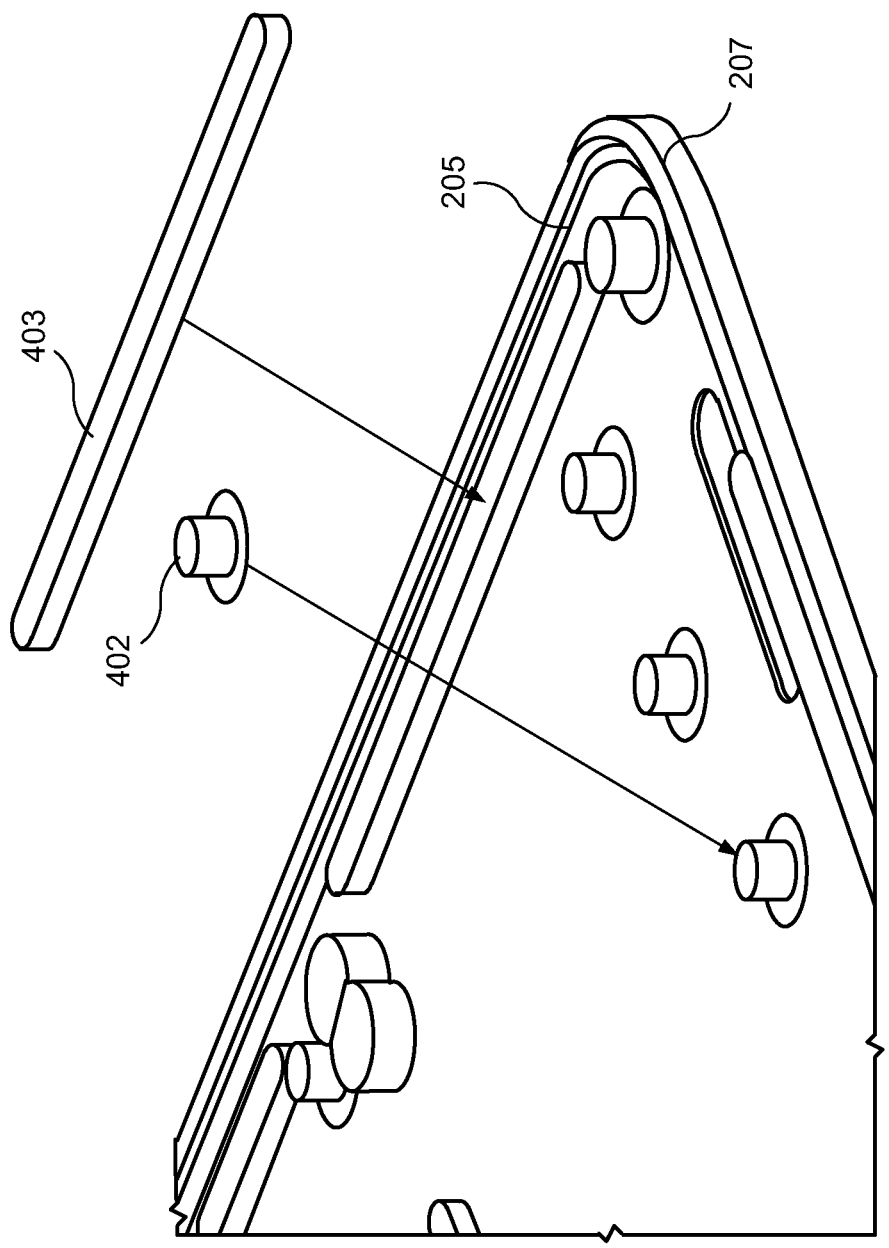
FIG. 5 depicts a perspective view of the lower right-hand corner portion of the embodiment of FIG. 4.

FIGS. 4 and 5 illustrate a panel 202 that includes multiple attached blanks 401. As discussed above, the base portion of the blanks may be inserted into the locating cavities 301 and the base of the blanks may be joined to the flat attachment surface defined by the cavities. The base of the blanks 401 may be flat and/or smooth to facilitate bonding to the flat attachment surface. In one embodiment, the blanks 401 may be bonded to the attachment surface by an adhesive; however, the joining mechanism for attaching the blanks to the panels 202 may vary. For example, the blanks may be laser welded, ultrasonically welded, friction welded and/or blazed to the attachment surface, and so on and so forth.

In other embodiments, the attachment surface defined by the cavities 301 may be textured. In one example, the attachment surface and the bases of the blanks 401 may have matching or mating surfaces. Thus, when the blanks 401 are inserted into the cavities 301, the base of the blanks and the attachment surface may interact to prevent twisting of the blanks with respect to the cavities. Similarly, the sidewalls of the cavities and the blanks may include corresponding textured surfaces to prevent twisting of the blanks with respect to the cavities.

The shape of the blanks 401 may vary according to different embodiments of the present disclosure. For example, some blanks may have a base portion (e.g., the portion of the blank that is inserted into the locating cavity 301) with a larger horizontal cross-sectional area than the body portion of the blank (e.g., the portion of the blank that is processed to produce the finished protruding feature). As shown in FIG. 5, for example, some blanks 402 may have a stacked cylinder configuration, in which the base portion that is inserted into the cavity has a larger diameter than the body of the blank. This blank design may ensure an adequate bonding surface between the attachment surface of the cavity and the base of the blank, while reducing the amount of CNC machining that is required to form the finished protruding feature and the amount of excess blank material that is wasted during manufacturing. In other embodiments, the blank may have a uniform horizontal cross-sectional area. For example, FIGS. 4 and 5 illustrate multiple examples of blanks that have a uniform horizontal cross-section, including an elongated blank having rounded edges 403 and a cylindrical blank 401.

The height of the blanks may vary depending on the protruding feature that will be formed from the blank. For example, a taller protruding feature may be formed from a blank that has a taller body portion, while a shorter protruding feature may be formed from a blank that has a shorter body portion. As shown in FIG. 5, the height of the base portion of the blanks may be the same as the depth of the locating cavities 301. In other embodiments, this height may be different than the depth of the locating cavities 301. Since the final dimensions of the finished protruding features may be determined by a CNC machine used to process the blanks, the thickness of any adhesive layer between the base of the protruding feature and the attachment surface need not be tightly controlled.

The blank may be formed from a material different from the material used to form the panel. For example, the panel may be formed from a fiber-in-matrix material, while the blank may be formed from a pure metal such as aluminum or steel, a metal alloy, a plastic, a ceramic and so on. Forming the blanks from a material other than a fiber-in-matrix materials may be advantageous, since, as discussed above, CFRP is susceptible to cracking or breaking under certain shear stresses that may be applied during CNC machining. By contrast, the blanks may be formed from materials having a combination of mechanical and physical properties for improved resistance to damage during the CNC machining process.

In addition, forming the panel separately from the blanks may produce superior cosmetic results. For example, injection molding a panel with integral protruding features may produce sink marks on the exterior of the panel. Further, maintaining tolerances of the protruding features may be difficult when the features are formed as an integral part of the panel. For example, injection molded parts may be susceptible to shrinkage, twisting, and/or deformation, thereby causing the protruding features to deviate from their intended locations. Embodiments disclosed herein may reduce these problems since the blanks may be CNC machined after they are attached to the panel, rather than injection molded during panel manufacture.

Figure 6:
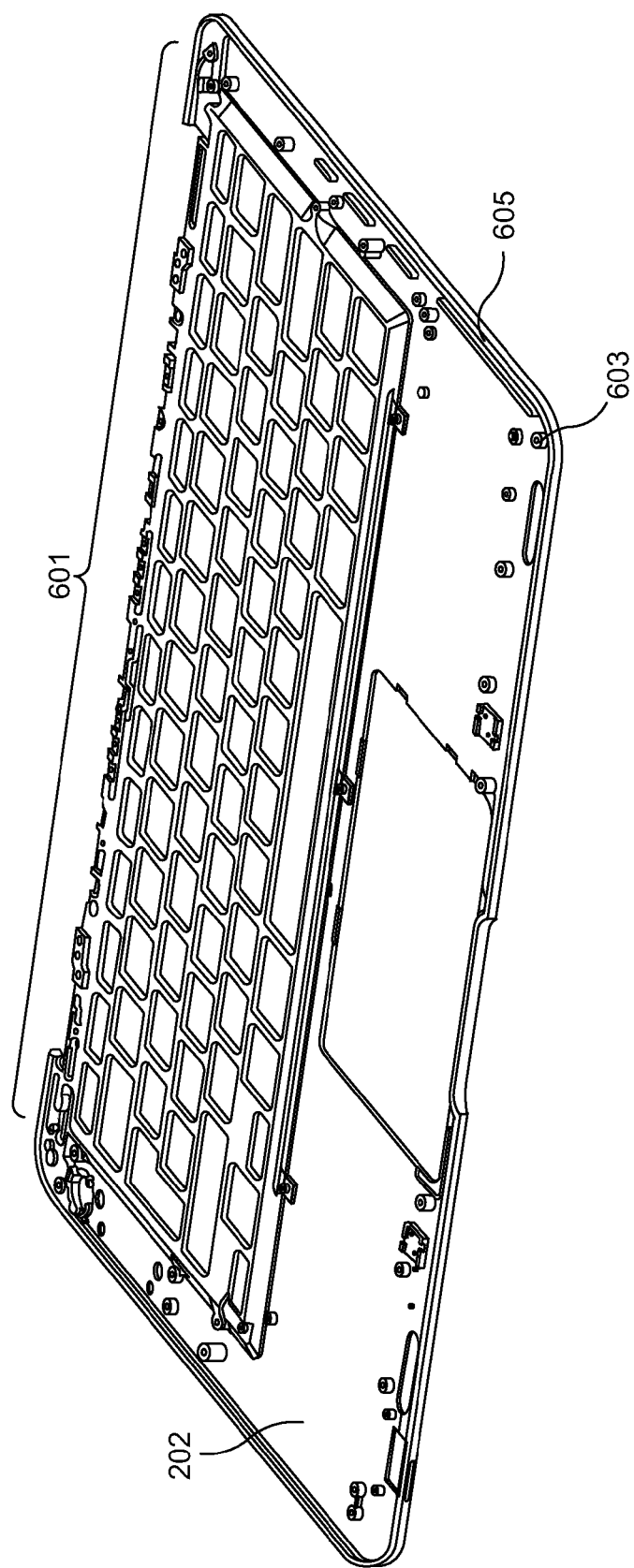
FIG. 6 depicts a perspective view of the embodiment of FIG. 2 after certain operations have been performed thereon.
Figure 7:
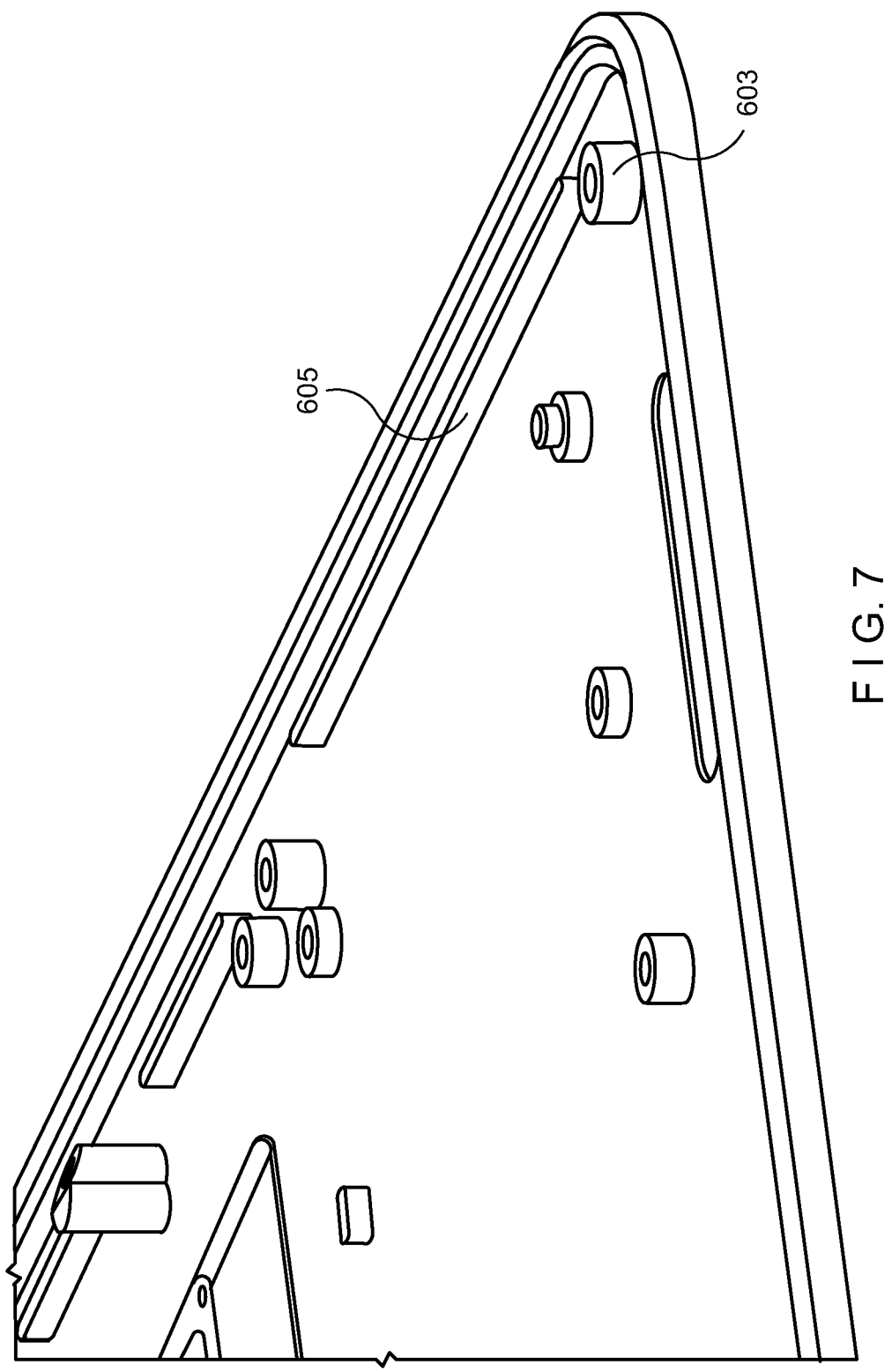
FIG. 7 depicts a perspective view of a lower right corner portion of the embodiment of FIG. 6.

FIGS. 6 and 7 illustrate a finished panel 202 after the blanks have been machined to form the final protruding features (e.g., 601, 603, 605, and so on). As discussed above, the blanks may first be attached to the panel 202 and then machined to their final form using a CNC machining process. However, in other embodiments, the blanks may be formed using any known manufacturing process. As shown to best effect in FIGS. 6 and 7, each of the blanks may be processed to form multiple protruding features. For example, a large blank, such as blank 407 of FIG. 4, may be machined to form tens or hundreds of different protruding features, each having a unique shape and texture. Additionally, the base portions of the blanks may also be processed using CNC machining techniques. For example, the top surface of the base portions may be tapered to form a level surface with respect to the panels.

Machining the blanks to form the protruding features after they are attached to the panel 202 may help to avoid pitfalls associated with known high-precision manufacturing techniques. For example, many such assemblies require that finished features be attached to the panel using heat-driven application methods, such as bonding, laser welding, friction welding, and brazing. This approach is flawed, however, since it may be difficult to maintain the thermal tolerances required for precisely positioning the features when heat is applied, due to the coefficient of thermal expansion of the features. Additionally, the equipment used to affix the finished features is often too inaccurate to maintain the requisite tolerances of the features. As such, this process is often susceptible to producing defects over time due to equipment wear or changes in environmental conditions.

The disclosed method of manufacture may reduce or avoid these problems, since the dimensions and positions of the protruding features are determined solely by the CNC machining process, which is extremely accurate and repeatable. For example, the disclosed method generally requires only one machine to finish all of the blanks since the relative positions and dimensions of the blanks are determined by the CNC machine, and thus are not subject to multiple tolerance errors caused by the use of multiple manufacturing machines. Further, the present method avoids deformation of the protruding features while they are being attached to the panel, since the heat-driven application techniques may be applied only to the preformed blank, and not to the finished protruding features.

FIGS. 8a-8c and 9a-9b illustrate example configurations of two protruding features 603 and 605 that have been formed from two different blanks 402 and 403, respectively. In particular, FIGS. 8a-8c illustrate a cylindrical blank 402 that has been processed to form a tubular boss (as ultimately shown in FIG. 8c). Referring to FIG. 8a, the body portion of the blank 402 may have a smaller diameter 801 than that of the base portion of the blank. For example, the diameter 803 of the base portion of the blank may be twice the diameter 804 of the finished tubular boss. As shown in FIG. 8b, the body portion of the blank 42 may be tapered in height 802 and in diameter during the machining process. The height and diameter of the base portion of the blank may or may not be altered during the machining process. After the blank has been machined to its final height and diameter, the blank may be drilled and tapped to form a tube, as shown in FIG. 8c.

FIGS. 9a and 9b illustrate an elongated blank 403 that has been processed to form an elongated protruding feature (as shown in FIG. 9b). As discussed above, the starting blank 403 may have a uniform horizontal cross-section. Turning to FIG. 9a, the top and sides of the body portion of the blank 403 may be tapered in any of height 902, width 901, and/or length 905 to form the finished protruding feature shown in FIG. 9b. The finished protruding feature 605 may therefore have a larger base portion and a narrower body portion (e.g., smaller width 903 and/or length 906), where the base portion has the same horizontal cross-sectional area as the starting blank 403, and a height 904 that is approximately equal to the depth of the cavity receiving the blank 403. The height of the base portion may or may not be altered during the CNC machining process for forming the protruding features.

FIG. 10 is a flowchart showing one sample method for forming an embodiment 100 or similar embodiments. It should be understood that certain operations may be performed in orders other than those shown here. For example, the panel may be created prior to forming the blanks. Accordingly, variations on the sample method will be readily apparent to those of ordinary skill in the art and are contemplated and embraced by this document. Further, the order of the operations shown here is for convenience only and should not be interpreted as necessitating any particular order for manufacture.

In operation 1001, the panel is formed. In one embodiment, the panel may be formed by compression molding. Typically, the panel is formed in a two or three piece mold, in which a top plate of the mold may be lowered into the mold base to distribute the mold to a void space formed by the top plate and mold base. Generally, this void space takes the shape of the finished panel. The panel may be formed from a fiber-in-matrix material, such as CFRP.

In operation 1003, locating cavities are formed on the surface of the panel. The locating cavities may be formed using a CNC machining process, and may each define a flat attachment surface at the base of the cavity. In operation 1005, the blanks are formed. As discussed above, some blanks may have a base portion that has a larger horizontal cross-sectional area than the horizontal cross-sectional area of the body portion, while other blanks may have a uniform horizontal cross-section. The blanks may be formed from a different material than the panels. For example, the blanks may be formed from aluminum, which is less susceptible to breakage under shear stresses than CFRP.

In operation 1007, the blanks are inserted into their respective locating cavities and bonded to the attachment surface defined by the base of the cavities. In other embodiments, the blanks may be attached to the attachment surface by welding or other means.

In operation 1009, the attached blanks may be processed to form the finished protruding features. For example, the body portion of the blanks may be tapered in height, width, diameter and/or length, and drilled and tapped to include bores. The protruding features may be formed by machining the blanks using a CNC machining process, and each blank may form multiple protruding features of different configurations.

Embodiments may house any number of electronic components. For example, certain embodiments may be used to form the exterior surface of a mobile telephone, a laptop or notebook computer, a tablet computing device, a desktop computer, a television, a stereo receiver, or practically any other electronic device. The embodiment may form substantially the entirety of an electronic housing or only a portion, such as the back casing and sidewalls. Alternate embodiments may not be electronics housings at all, but instead may form any number of objects typically formed from metals or plastics. For example, certain embodiments may be formed as described herein to create serving utensils or dishes. Others may create boxes or storage containers.

It should be noted that a variety of objects may be formed in accordance with the methods and embodiments described herein. For example, a fiber-in-matrix enclosure may be used to construct the head of a golf club. Alternative embodiments may take the form of: turbine blades (for example, for a windmill or turbine); propellers; aircraft wings, fins or tail structures; bicycle parts such as crank arms and seat posts; shipping containers; skis and snowboards; and so on.

The foregoing has been generally described with respect to particular embodiments and methods of manufacture. It will be apparent to those of ordinary skill in the art that certain modifications may be made without departing from the spirit or scope of this disclosure. For example, a fiber other than carbon may be used as a strengthening or stiffening element. As one example, certain metals may be used instead, or another type of plastic may be used. Accordingly, the proper scope of this disclosure is set forth in the following claims.

I claim:

1. A housing, comprising:
    at least one panel formed from a first material, the at least one panel including a locating cavity on a first surface thereof and the locating cavity defining an attachment surface; and
    a protruding feature formed from a blank made of a second material different than the first material; wherein
    the blank is attached to the attachment surface before the protruding feature is formed;
    the locating cavity extends only partially through the at least one panel; and
    a connection between the blank and the attachment surface is not visible from a second surface of the housing, the second surface opposing the first surface.

2. The housing of claim 1, wherein the first material is a fiber-in-matrix material.

3. The housing of claim 2, wherein the first material is a carbon fiber-reinforced polymer.

4. The housing of claim 1, wherein the at least one panel is formed by an injection molding process.

5. The housing of claim 1, wherein the protruding feature is formed by a computer numerical controlled process.

6. An enclosure for an electronic device, comprising:
    a casing formed from a first material, the casing including at least one locating cavity on a surface thereof defining an attachment surface; and
    at least one protruding feature formed from a blank formed from a second material different from the first material, wherein the at least one protruding feature is formed from the blank, the blank attached to the attachment surface before the at least one protruding feature is formed ; wherein
    the locating cavity extends only partially through the casing; and
    a connection between the protruding feature and the attachment surface is not visible from an exterior of the casing.

7. The enclosure of claim 6, wherein the first material is a fiber-in-matrix material.

8. The enclosure of claim 7, wherein the first material is a carbon fiber-reinforced polymer.

9. The enclosure of claim 6, wherein the second material is aluminum.

10. The enclosure of claim 6, wherein the protruding feature forms an attachment feature for a second portion of the enclosure.

11. The enclosure of claim 6, wherein at least one of the at least one protruding features includes a base portion and a body portion. the base portion having a first horizontal cross-sectional area and the body portion having a second horizontal cross-sectional area, and the first horizontal cross-sectional area is larger than the second horizontal cross-sectional area.

12. The enclosure of claim 11, wherein the base portion is sized to be received in the locating cavity.

* * * * *